July 31, 1934.  G. D. HARRIS  1,968,764
APPARATUS FOR TREATING MATERIALS
Filed July 30, 1930  8 Sheets-Sheet 1

Inventor
GORDON DON HARRIS

July 31, 1934.  G. D. HARRIS  1,968,764
APPARATUS FOR TREATING MATERIALS
Filed July 30, 1930   8 Sheets-Sheet 4

Inventor
GORDON DON HARRIS
By Semmes & Semmes
Attorneys

July 31, 1934.　　　　G. D. HARRIS　　　1,968,764
APPARATUS FOR TREATING MATERIALS
Filed July 30, 1930　　　8 Sheets-Sheet 5

Inventor
GORDON DON HARRIS
By Semmes & Semmes
Attorneys

Patented July 31, 1934

1,968,764

UNITED STATES PATENT OFFICE 1,968,764

APPARATUS FOR TREATING MATERIALS

Gordon Don Harris, Sound Beach, Conn., assignor to The Industrial Dryer Corporation, Stamford, Conn., a corporation of Connecticut Application July 30, 1930, Serial No. 471,776

6 Claims. (Cl. 34—12)

This invention relates in general to the treatment of materials and more particularly has reference to methods and apparatus for treating shoes and other materials and articles of manufacture with conditioned gases.

Manufacturing conditions in shoe factories have undergone certain radical changes with an object of reducing the length of time that shoes are in the process of manufacture. Up until recent times, shoes were dried by allowing them to remain on the lasts in an open room, which not only occupied a considerable length of time, but made it practically impossible to accurately determine production schedules. For instance, in damp weather, shoes will remain on the last longer than in dry weather or during the winter time when the heat is on in the factory.

Under open room methods of drying, shoes reaching the shipping room often appear to be dry and in condition to ship, but after reaching the retailer, moisture in the soles and other parts will diffuse to the surface causing blooming, discoloring the soles or the finishing of the upper leather, and this is a very objectionable feature. Furthermore, if shoes have not been properly dried on the last, then further drying and shrinkage will take place after the last has been removed, causing distortion in the shoe.

The use of shoe conditioners has made it possible to eliminate the uncertainty in production and at the same time, improve the quality of the finished shoe, owing to the fact that moisture is removed from the wetter portions of the shoe without subjecting the comparatively dry parts to excessive drying. This results in all of the component parts of the shoe being in a relation to each other as to moisture content, so that a shoe that is properly dried and conditioned will stand up and hold its shape better than shoes which have been dried under the open room method, because shrinkage has been completed on the last.

One method of properly drying shoes has been disclosed in Patent No. 1,667,315. As disclosed in that patent, apparatus for carrying out the process consisted of compartment type conditioners. While the compartment type conditioner produces work that is satisfactory in every particular, the form of the apparatus itself has certain disadvantages in that it is necessary to load a number of racks at a time, which means that continuous loading and unloading is not practical.

It is necessary in employing the compartment type machine to accumulate at least enough racks to partially load a machine, which racks during accumulation, occupy floor space which could be used to advantage for other purposes and causes a loss of production time. In addition, the racks, after treatment of the shoes, are removed from the conditioner after a definite length of time, which results in further accumulation of racks and loss of time on production schedules.

In addition to the above disadvantages encountered in the shoe industry, there are also similar disadvantages met in other industries in which materials are treated with conditioned gases.

An apparatus of the tunnel type, such as set forth in my copending application Serial No. 450,487, filed May 7, 1930, adapted to be continuously operated to treat materials with conditioned gases, is very satisfactory for overcoming the foregoing disadvantages. However, in certain instances, due to lack of availability of floor space or to the location of other machinery, it has been found undesirable to have the loading and unloading ends of the tunnel type treating apparatus remotely located. The present invention seeks to overcome all of the described disadvantages by providing a method and apparatus for continuously treating material in which the material may be both loaded and unloaded at the same point or at spaced points.

A primary object of this invention is to devise methods and apparatus for treating materials in a continuous manner in which the zone for loading the material may be adjacent the unloading zone or positioned in any desired relation thereto.

Another object of this invention is to devise an apparatus and method of treating materials which avoids the disadvantages of the prior art.

Yet another object of this invention is to devise an apparatus for continuously treating shoes to bring about the proper drying of all component parts of the shoes.

A further object of this invention is to devise a method of treating materials by means of a conditioned gas wherein the humidity of the gas is controlled by bleeding a portion of the gas, the humidity of which is in excess of that desired, from the system.

Still another object of this invention is to devise an apparatus for continuously treating materials in which the materials are brought to the proper condition by means of conditioned gases.

A still further object of this invention is to devise an apparatus and method for treating materials to dry the same in which the humidity of the conditioning gas is controlled by supplying water vapor thereto to suppress the elimination of water from the dryer components.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The present invention is based on the concept of treating materials and articles of manufacture with conditioned gases and consists in the provision of an apparatus which is susceptible of operation to carry out the process set forth in Patent No. 1,667,315, in a continuous manner.

Apparatus for carrying out the present invention consists essentially of an elongated chamber or tunnel through which material undergoing treatment is passed, and across which gas of the proper condition for treating the material is caused to flow. Gas for treating the material and which is caused to flow transversely to the movement of the material undergoing treatment is conditioned in a plurality of compartments extending along the length of the chamber, and the gas from one of the compartments is passed substantially transversely through the elongated chamber or tunnel into an exhaust compartment which receives substantially all of the gas from one conditioning compartment.

While broadly, apparatus for carrying out the present invention is somewhat similar to that described and claimed in my copending application Serial No. 450,487, filed May 7, 1930, there is an essential difference in that in the present application, the elongated chamber or tunnel is made continuous so that material to be treated may be loaded onto the conveyor for moving the material through the chamber at one point, and the material may be removed from the chamber at substantially the same point at which it was loaded. This result is accomplished by constructing the treating chamber in the form of a somewhat distorted annulus.

As in the case of the apparatus described in the above referred to copending application, varying conditions may be maintained throughout the length of the tunnel, so as to vary the condition of treatment of the material throughout the entire time it is passing through the conditioning apparatus.

In the present invention, the proper humidity of the conditioning gas may be obtained by bleeding a portion of the gas circulating in contact with the material undergoing treatment from the apparatus and making up a supply of fresh unhumidified gas. This procedure is, of course, of particular advantage when materials are being treated to remove moisture therefrom. The present invention also contemplates means for supplying humidity to the conditioning gas or air in the form of true water vapor. This procedure is of advantage when it is desired to suppress the elimination of moisture from certain components of the material undergoing treatment, whereas other components are to be further treated to remove moisture therefrom. In using the term "true water vapor", I wish to distinguish it from gas containing particles of water such as produced by spraying, atomizing and other mechanical mechanism.

In order to make my invention more clearly understood, I have shown in the accompanying drawings, means for carrying the same into practical effect without limiting the improvements in their useful applications to the particular constructions which, for the purpose of explanation, have been made the subject of illustration.

Figure 1:
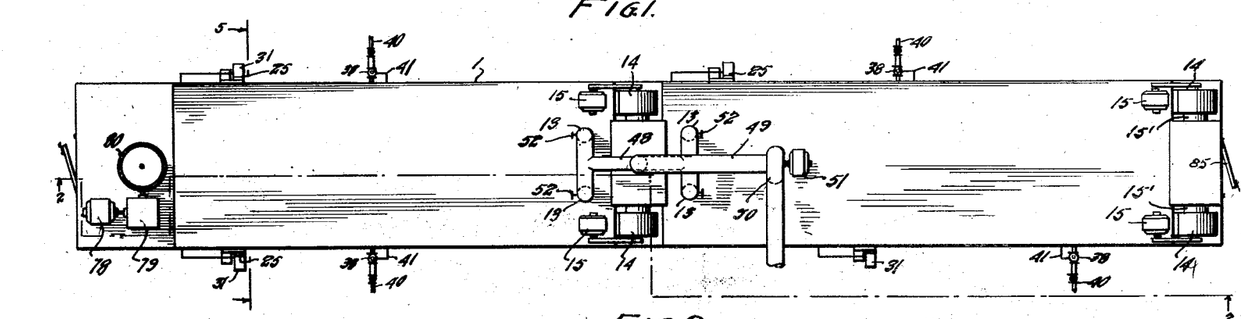
Figure 1 is a plan view of an apparatus especially adapted for carrying out the present invention.
Figure 2:
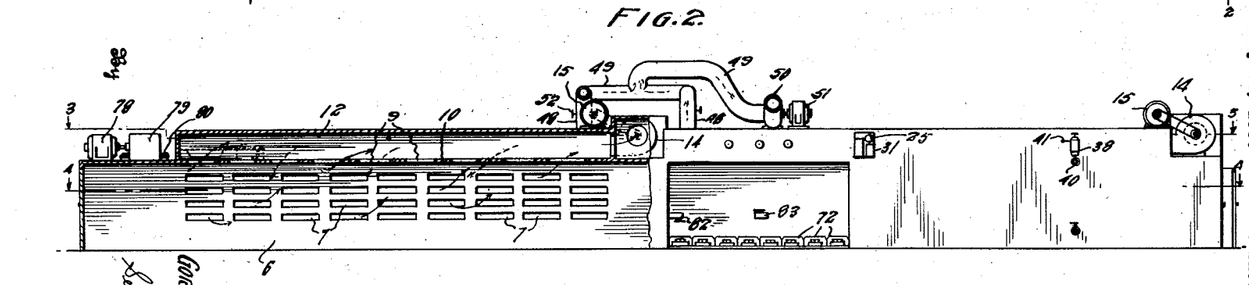
Figure 2 is a partial vertical sectional view of the apparatus shown in Figure 1, taken on line 2—2 of Figure 1.
Figure 3:
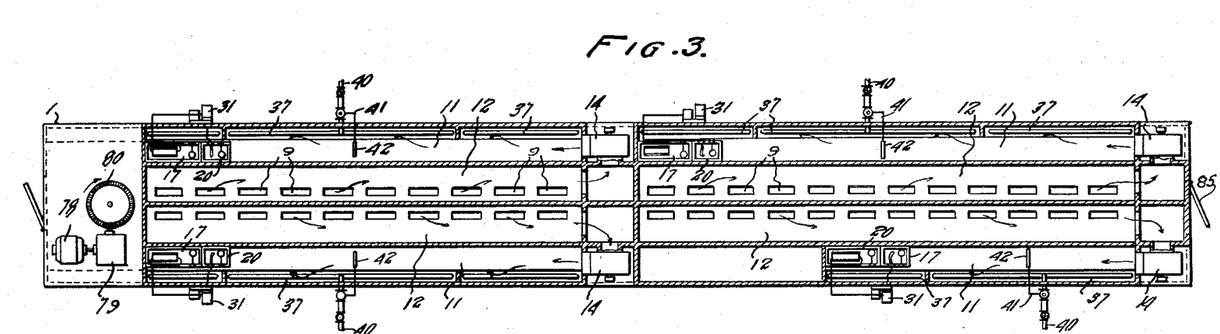
Figure 3 is a horizontal sectional view taken on line 3—3 of Figure 2, showing the construction of the compartments arranged in the upper portion of the apparatus.
Figure 4:
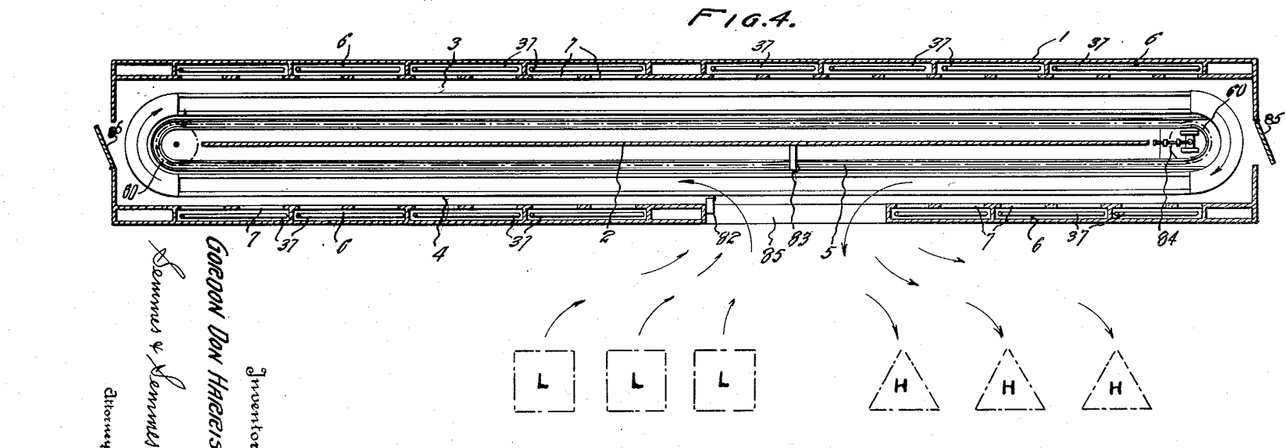
Figure 4 is a view taken on line 4—4 of Figure 2 illustrating the construction of the conditioning chamber.

In the drawings in which similar reference numerals indicate corresponding parts, there is shown an apparatus adapted for carrying out the treatment of shoes and other articles of manufacture and materials in accordance with the present invention. As illustrated, generally, apparatus for carrying out the invention consists essentially of an endless tunnel through which material is adapted to be conveyed while being subjected to the action of conditioned gas. In Figure 4 of the drawings, I have shown a view which clearly indicates the application of the present invention. As illustrated, the apparatus consists of a chamber 1 divided by a partition 2 into two passageways 3 and 4 communicating with each other at the ends of the apparatus, thereby forming an endless tunnel through which the material undergoing treatment is passed by means of a suitable conveyor 5, which will be more fully described hereinafter.

Figure 5:
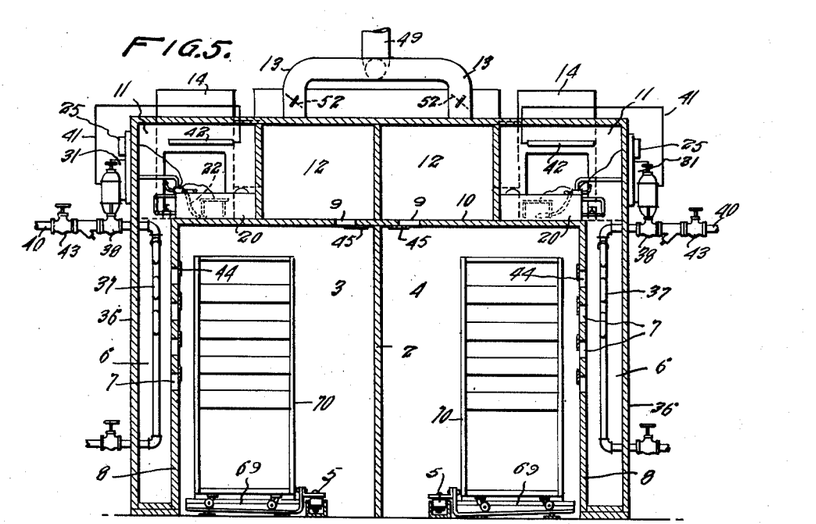
Figure 5 is a vertical sectional view taken on line 5—5 of Figure 1, showing the arrangement of the several compartments in the apparatus.
Figure 6:
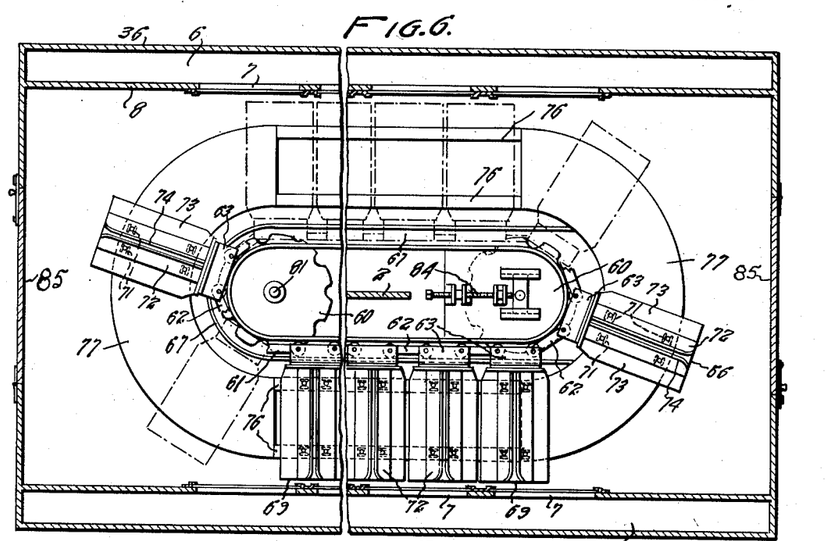
Figure 6 is a partial horizontal sectional view illustrating in detail, the arrangement of the conveying mechanism for moving racks containing material to be treated through the apparatus.

A plurality of compartments 6 are associated with each of the side walls of the chamber 1 and communicate with the interior of the chamber through a plurality of slots 7, formed in the walls 8 of the chamber 1. In treating material passing through the endless tunnel formed in the chamber 1, gas passes from the compartment 6 through the ports or slots 7, over the material to be treated, and passes from the chamber into an exhaust compartment 12. The apparatus shown in Figs. 1 to 5 of the drawings is of a type in which the conditioning gas passes through the upper wall at the other side of the tunnel. As clearly illustrated in Figure 5, the conditioning gas enters the tunnel through the ports 7 in wall 8, and exhausts through the ports 9 formed in the upper wall 10 of the tunnel.

In order to effect a flow of a conditioning gas through the ports 7 into the tunnel and from the tunnel through ports 9, I have associated suitable gas conditioning and exhaust compartments with each side of the chamber 1. For instance, there is a humidifying compartment 11 in communication with the heating compartment 6, through which the gas passes before passing into the treating chamber 1. Upon discharge of the gas from the chamber 1 through ports 9, the gas flows into an exhaust compartment 12.

For the sake of simplicity, I have shown the exhaust compartment 12 arranged on top of the treating chamber in juxtaposition to the humidifying chamber 11. The gas discharged from the treating chamber into the exhaust compartment 12 may be exhausted to the atmosphere through flue 13 or may be recirculated through the humidifying chamber 11 and heating chamber 6 back into the treating chamber in contact with the articles or material undergoing treatment. The circulation of the gas through the several compartments and treating chambers is brought about by the recirculating blowers 14, which are driven by suitable sources of power 15. It will be appreciated, therefore, that the gas will be withdrawn from the compartments 12 and will be forced by the blowers into the compartment 11 from which they will flow downwardly into the heating compartment 6 and be distributed by means of the ports 7 into the treating chambers 3 and 4.

When it is desired to humidify the materials undergoing treatment, water vapor may be supplied to the gas by humidifying means such as shown in Figures 10 to 14. The humidifying apparatus consists of a tank 17, containing a body of water or other suitable liquid 18, adapted to be heated by heating elements 19. The heating elements 19 have been represented as being of the electrical type, but I wish it to be clearly understood that these elements may be of any other type adapted to be controlled automatically. Adjacent the tank 17 is another tank 20, containing a body of liquid 21 into which extends a wick 22 adapted to supply moisture to a temperature responsive device 23, which communicates through the connection 24 with a humidostat or humidity control element 25.

Each of the tanks 17 and 20 is provided with suitable liquid inlet means associated with the supply conduit 26. Float controlled valves 27 serve to regulate the amount of liquid supplied to the tanks 17 and 20 in order to maintain a predetermined level of liquid in the tanks regardless of the quantity of liquid evaporated or withdrawn from the tanks. Overflow and drain conduits 28 are associated with the tanks to prevent the liquid exceeding a predetermined level. The drain conduits 28 are also in communication with the lower portion of the tank through valves 29 by means of which all of the liquid may be withdrawn from the tanks.

Figure 15:
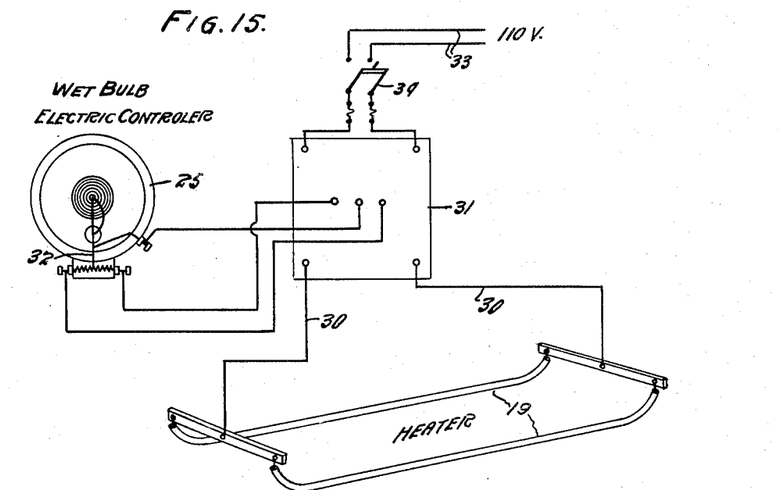
Figure 15 is a diagrammatic representation of the circuit employed for controlling the heating of the humidifying liquid.

The electrical heating elements 19 are associated with the circuit passing through conduit 30, which circuit is adapted to be affected by the control device 25. A diagrammatic representation of this circuit is shown in Figure 15, in which the control device 25 is associated with a relay actuated circuit maker and breaker postioned within the housing 31. When the element 32 of the wet bulb electrical controller 25 is in one position due to cooling of the bulb 23, a relay circuit will be established which will connect the conduits 30 with the power line 33 through manually controlled switch 34. This will bring the heating elements 19 into operation, which will effect generation of liquid vapor and thereby increase the humidity of the conditioning gas flowing through the compartment 11 containing the humidifying apparatus.

Upon an increase in the relative humidity of the gas in the compartment 11, the evaporation of moisture from the wick 22 will be decreased, resulting in an increase in the temperature of the bulb 23 which effects the movement of the element 32 to the other position. Upon movement of the element 32 to the other position, another relay circuit will be established which will break the connection between the heating element 19 and the power line 33. If desirable, a tell-tale lamp 35 may be connected with the heating circuit to indicate when the heating elements 19 are in operation. It will be appreciated that the control circuit herein described may with slight modifications be employed for regulating the heating of the humidifying liquid with steam or other heating agents. For instance, the control mechanism described may be associated with the control valves of a fluid heating system.

When gas is humidified by means of the water vapor generating units herein described, a true water vapor is introduced into the gas as distinguished from mechanically dispersed water. For instance, when gas is humidified by spraying or atomizing water therein, droplets of water are found in the gas and may deposit on the surface of the material undergoing treatment with the gas producing what is known as surface wetting. On the other hand, however, gas humidified in accordance with the present invention contains moisture in the form of true water vapor and when brought in contact with material to be treated, acts in a different manner. For instance, when the humidity of the material is less than that of the gas, vapor may be taken into the interior of the material. Under ordinary drying conditions, however, the vapor in the gas serves to "hold" the dry components of the material, while permitting the removal of moisture from the wetter components.

After being supplied with moisture in compartment 11, the gas is passed down through the compartment 6 formed between the wall 8 of the chamber 1 and an outer wall 36. Suitable heating coils 37 are positioned within the chamber 6 in the path of the gas flowing therein so as to supply sufficient heat to the gas to properly condition the same. It will probably be found to be of advantage to control the heating effect of the heating coils 37. This may be accomplished by providing a thermostatically controlled valve 38 in the hot fluid supply line 40. Thermostatically controlled valve 38 may be of any conventional type and is associated through suitable conduits 41 with a temperature responsive device 42, positioned within the chamber 11. While I have shown the temperature responsive device 42 within the compartment 11, I wish it to be clearly understood that if found desirable, it may be positioned in any part of the treating apparatus where it may be most advantageously employed.

The hot fluid supply conduit is also provided with a control valve 43 so that the heating effect of the coils can be manually controlled. Steam or any other heated fluid may be circulated through the coils 37 to heat the gas passing through the compartment 6.

It will be noted that the ports 7 in the wall 8 are provided with closure members 44 which are adjustable relative to the ports 7 so that the effective cross section area of the ports may be regulated. Similar closure members 45 are associated with outlet ports 11 in the upper wall 10 of the treating chamber. I have found by actual experiment that by properly regulating the closures 44 on the several ports 7 formed in the wall 8, the gas will be caused to flow through the treating chamber in a well distributed manner so as to properly condition all of the material carried within the racks 70 passing through the treating chambers.

The closure members 44 and 45 may be secured to the walls 36 and 11, respectively, in any desired manner. One method of securing them to the walls has been described in my copending application Serial No. 450,487, filed May 7, 1930.

As shown in the drawings, the apparatus comprises four distinct sections which are independently operated. Of course, more or less sections can be employed as desired. Each section is constructed as hereinbefore set forth and is adapted to be operated in the manner just described to effect the conditioning of material within the section. With this arrangement, the gas in any particular section may be treated differently from the gas in the other section. Consequently, the material passing through the treating tunnel may be subjected to four distinct stages of treatment.

In the operation of each section as herein described, most of the gas in compartment 12 will probably be withdrawn by the blower 14 and recirculated. It may be desirable in some instances to discharge a portion of the gas from the compartment 12. In the several figures of the drawings, I have shown an outlet flue 13 associated with each compartment 12. The flues communicate with a manifold or main 48, which is connected with the intake line 49 of the associated blower 50, driven by any suitable source of power such as the motor 51. It will be appreciated that when the blower 50 is in operation, a portion of the gas will be withdrawn from compartment 12 and exhausted.

In order to control the flow of gas from the compartments 12 through the flues 13, I have provided suitable valve members 52, which may be either manually or automatically controlled. With this construction, it will be appreciated that perfect circulation of gas through the treating chambers of the several conditioning compartments may be maintained, and a portion of the gas exhausted from the treating chambers may be discharged.

Figure 17:
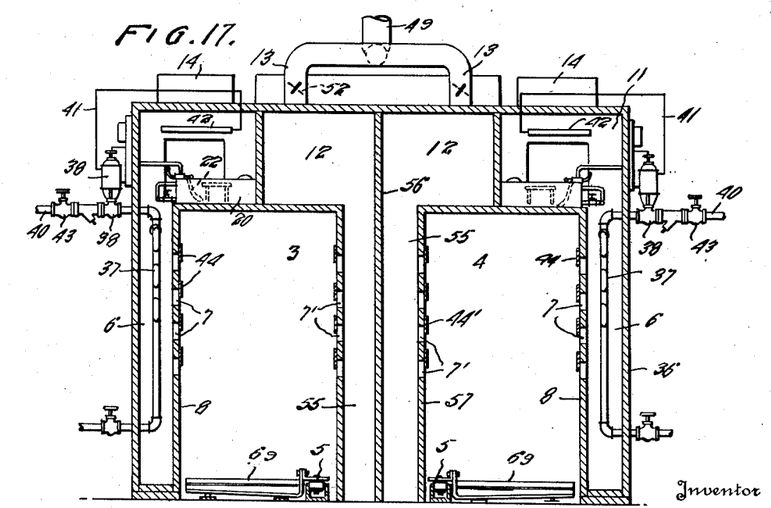
Figure 17 is a view somewhat similar to Figure 5 of a slightly modified form of the conditioning chamber.

In some instances it may be desirable to provide a construction such as shown in Fig. 17. The construction shown in this figure is substantially the same as that shown in Fig. 5, with the exception that two additional compartments 55 are formed between the chambers 3 and 4. Parts in this figure, corresponding to those shown in the other figures, have been designated by corresponding reference numerals.

As illustrated, the entire device is divided into two parallel portions by the partition 56, each portion comprising a chamber 3 or 4 having a heating compartment 6 and exhaust compartment 55 positioned on each side thereof, and with a humidifying and exhaust compartment 11 and 12, respectively, positioned above the same.

This form of apparatus differs essentially from that shown in the other figures in that the gas leaves the chambers through a plurality of rows of openings in the side wall instead of through the single row in the roof. Walls 57 between the chambers and the compartments 55 are provided with a plurality of ports or slots 7' which are preferably positioned directly opposite the ports 7 in the wall between compartment 6 and chamber 4. These ports are also provided with regulating closures 44'.

An apparatus constructed in accordance with the showing in Fig. 17 is of advantage in that the conditioning gas can be passed through the treating chamber in evenly distributed, well defined streams which maintain their direction of flow in substantially a straight line. This feature has been described in connection with a compartment type of apparatus in my copending application Serial No. 450,487, filed May 7, 1930.

Figure 20:
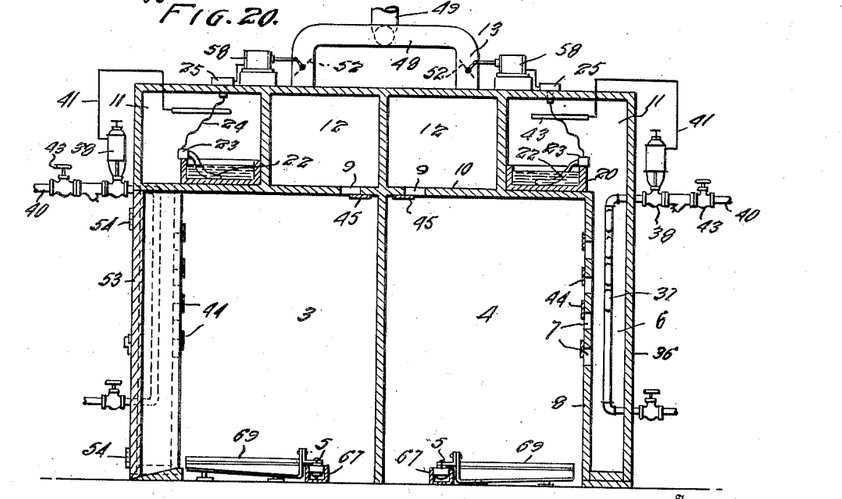
Figure 20 is a sectional view somewhat similar to Figure 5 of an apparatus provided with means for automatically controlling the discharge of humidified air from the apparatus.

When materials are treated to decrease their moisture content, the treating apparatus may be modified as illustrated in Fig. 20. This modification consists in associating the humidity control mechanism with the valves or dampers in the flues 13 for discharging gas from the treating apparatus. As shown in Fig. 20, the flues 13 which communicate with the exhaust manifold 48 are provided with valves 52, with which are associated motors 58, controlled by humidostats 25. Wet bulb temperature regulating devices similar to those employed in the other forms of apparatus herein described and as shown in detail in Figures 10–14, are positioned in the compartments 11. The prime difference between the humidity control in this device and that described in connection with the other forms of apparatus, is that in this case, the temperature responsive device actuates a control device which controls the operation of the motor 58. The motor 58 may be of any conventiontal type, such as a pneumatic motor or electrically operated motor.

The use of humidifying tanks in this form of invention is optional and when employed, may be of a type adapted to supply a constant amount of water vapor to the gas passing through the chamber 11. For most drying purposes, it will be unnecessary to supply additional moisture to the conditioning gas, and humidifying tanks will not be necessary. In any event, the humidity of the gas may be controlled by permitting a portion of the gas, particularly if it contains excessive moisture, to be bled from the system through the exhaust flues 13.

In operation, the conditioning gas is withdrawn from the compartment 11 through the ducts 15' into the inlet of the blower 14 and from the blower 14 is forced into the compartment 11. From compartment 11, the gas is passed downwardly into compartment 6, where it is heated to the desired temperature, and from this compartment, it is passed through the controllable ports 7 into the treating chamber. From chamber 4, the gas is withdrawn through the outlet port 9 into the compartment 12, from which the majority of the gas is recirculated, and a portion is discharged to the discharge flues 13. In the event that the gas circulating is dry, there will be a considerable amount of moisture evaporating from wick 22 surrounding the temperature responsive device 23. This will effect cooling of the temperature responsive device 23, which through the control device 25, will actuate motor 58 to close valve 52, thereby causing substantially all of the gas to be recirculated in contact with the material undergoing drying treatment.

When the humidity of the circulating gas reaches a predetermined point, the evaporation of moisture from wick 23 will be decreased by reason of the small absorptive capacity of the circulating gas. Due to the lack of evaporation from wick 22, the temperature responsive device will record a temperature more nearly that of the circulating gas and will actuate the control device which in turn will affect operation of the motor 58, to open the valve 52, and thereby permit a portion of the circulating gas to be discharged from the apparatus. It will be appreciated that upon discharging gas from the apparatus, gas from the atmosphere will be drawn into the apparatus through the loading and unloading openings and will have a moisture content low enough to effect proper drying of the material undergoing treatment.

Figure 19:
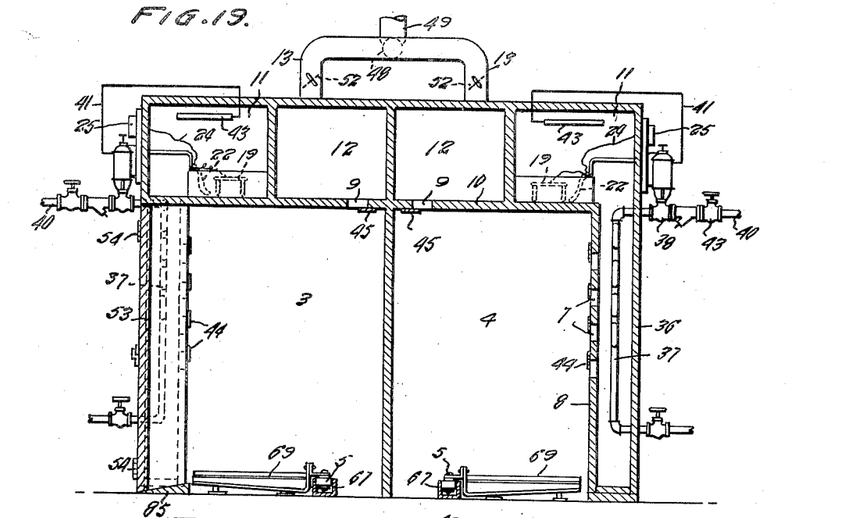
Figure 19 is a sectional view somewhat similar to Figure 5 of a slightly modified form of apparatus which is provided with doors so as to maintain the condition of the treating gas over a long period of time.

If the treating chamber is to be used as a holding room, it may be desirable to provide doors or other suitable closures on the loading and unloading opening of the treating chamber. In Figs. 19 and 20, I have shown a construction in which the treating chamber is provided with doors 53, which may be associated with the chambers in any desirable manner such as, for instance, by the hinges 54.

This construction permits the apparatus to be shut off at night and closed so that the interior thereof will not be in communication with the atmosphere. By preventing the access of the atmosphere to the material in the treating apparatus, the condition of the material will not be affected. If desired, the water vapor generators may be maintained in operation while the apparatus is shut down.

One of the features of this invention which contributes to its successful operation is the unique conveying apparatus and its control mechanism. At each end of the apparatus, there is mounted a sprocket 60 over which passes a conveyor chain 61. This chain is of the roller type and is formed of a plurality of links 62 and 63 pivotally connected by pins 64, on which are mounted the rollers 65. As is customary, the sprockets 60 and links and rollers are of sizes so related that the rollers may be received in the depressions or grooves formed on the periphery of the sprockets.

It should be noted that each of the lower links 63 have a wareplate 66 attached thereto adapted to support the chain a predetermined height above a track member 67. The track 67 extends the length of the treating apparatus coextensively with the conveyor chain. Track 67 is of channel shaped cross section, having a plurality of side walls which cooperate with the rollers 65 to maintain the chain in alignment between the sprockets 60.

In place of the ordinary type of link, the upper links 63 are provided with a flange portion 68 to which is attached a carriage 69 for conveying a material carrying rack 70 through the treating apparatus.

Figure 7:
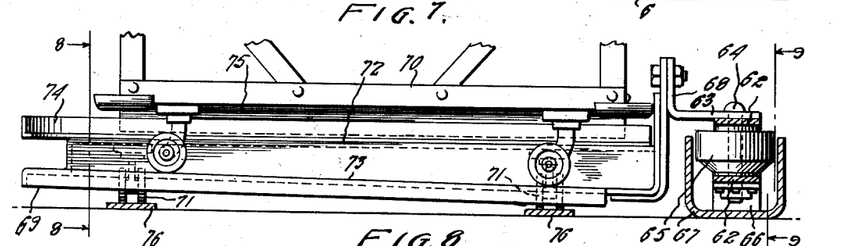
Figure 7 is a detail view of a portion of the conveying mechanism showing the manner in which a material carrying rack is arranged thereon.
Figure 8:
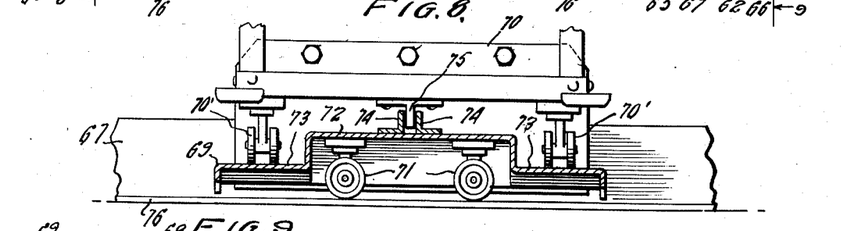
Figure 8 is a view taken on line 8—8 of Figure 7.
Figure 9:
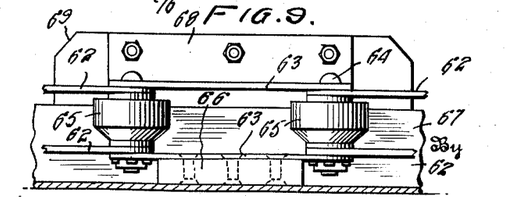
Figure 9 is a constructional detail view taken on section line 9—9 of Figure 7.
Figure 10:
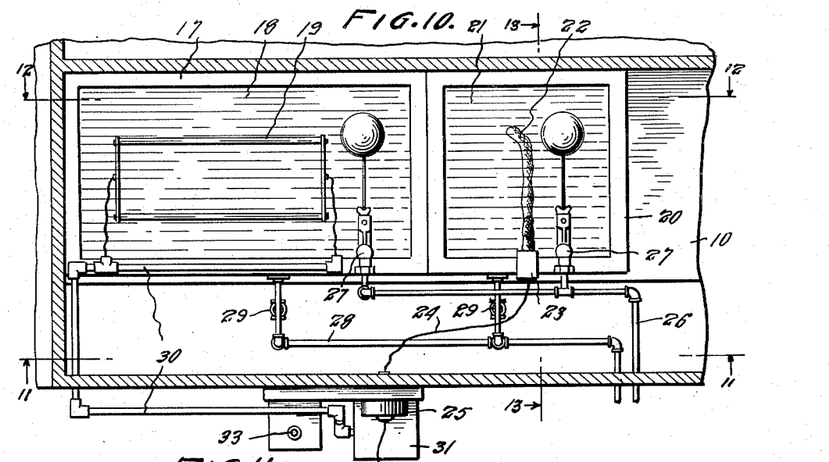
Figure 10 is a view of the humidifying and humidity control apparatus for supplying true water vapor to the treating gas.
Figure 11:
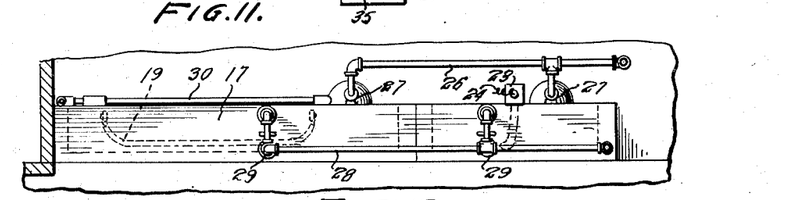
Figure 11 is a view taken on line 11—11 of Figure 10.
Figure 12:
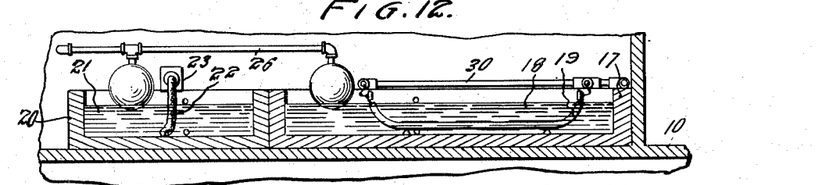
Figure 12 is another sectional view taken on line 12—12 of Figure 10.
Figure 13:
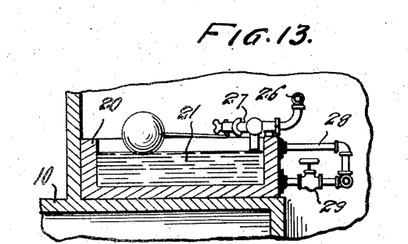
Figure 13 is a sectional view through the tank for supplying moisture to the wet bulb of the humidity control device taken on line 13—13 of Figure 10.
Figure 14:
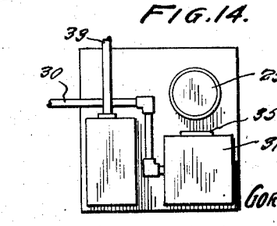
Figure 14 is a view of the humidity control apparatus employed for regulating the action of the electric heating elements.

As clearly shown in Figures 7 and 8, the carriages 69 for carrying the material supporting racks 70 are mounted on rollers 71 and are provided with platforms, the surfaces of which are shaped to form tracks onto which the rollers 70' of the material carrying rack or truck 70 is to be received. The rollers or casters 70' have been illustrated as of the swivel type, but any suitable type may be used. For instance, as illustrated in Figure 8, the platform of the carriage is formed with a high portion 72 on each side of which are the tracks 73 which are of somewhat lower elevation than the portion 72. It will also be noted from Figure 7, that there is a slight incline or pitch to the platform of carriage 69, which tends to cause the carriage to be retained thereon during transit through the treating apparatus.

In order to maintain the rack 70 in the proper position on the carriage 69, the high portion 72 of the carriage is equipped with a slot which, as shown in Figure 8, is provided for by the two angle members 74. A depending flange 75 carried by the rack 70 is adapted to cooperate with the groove formed between the angle members 74 so as to maintain the rack 70 in position while being transported on the carriage 69 through the treating apparatus.

In order to minimize the friction between the rollers 71 of the carriages 69, suitable tracks 76 are provided for the rollers 71. It has been found preferable to substitute plates 77 for the tracks at the ends of the apparatus where the carriages are moved in an arc in passing about the sprockets 60.

Power for driving the conveyor chains through the apparatus may be supplied by a source of power such as the electric motor 78 which is connected through suitable reduction gearing 79 and bevel gear 80 with a vertical shaft 81, on which is secured one of the sprockets 60. The ratio of the reduction gearing will depend upon the particular installation and the speed at which the conveyor is to be operated. In order to compensate for any increase in the length of the chain due to wear or other causes the idling sprocket 60 at the other end of the apparatus is supported on a floating mounting, the position of which is adapted to be adjusted by the adjusting means 84.

In operation, material or articles to be treated, such as shoes, are loaded on the racks 70 which may be of any desired construction, and the racks are run onto the conveyor platforms 69. If the conveyor is at a lower level than the factory floor, the racks can be run directly on the platforms, but if it is at a higher level which is likely when the floor is not cut to install the conveyor, a small ramp 85 may be employed.

Due to the incline in the platform 69, the rack will probably run all the way to the rear thereof and be maintained in position so that it may be conveyed through the treating apparatus.

In the event that one of the racks is not properly placed on the carriage 69, the rack upon movement of the conveyor, will engage with an automatic stop switch 82 which will break the electric circuit through the conveyor motor and cause the conveyor to stop. If desired, the stop switch 82 may also be connected with a circuit which energizes a signalling device such as a light or bell to indicate to the operator that the conveyor has stopped. Upon the operator shoving the rack into its proper position on the platform 69, engagement of the rack with the stop switch 82 will be avoided and the conveyor will start up again in operation. Of course, if desired, the circuit may be so arranged that it will be necessary for the operator to operate a switch to again start the motor.

Figure 16:
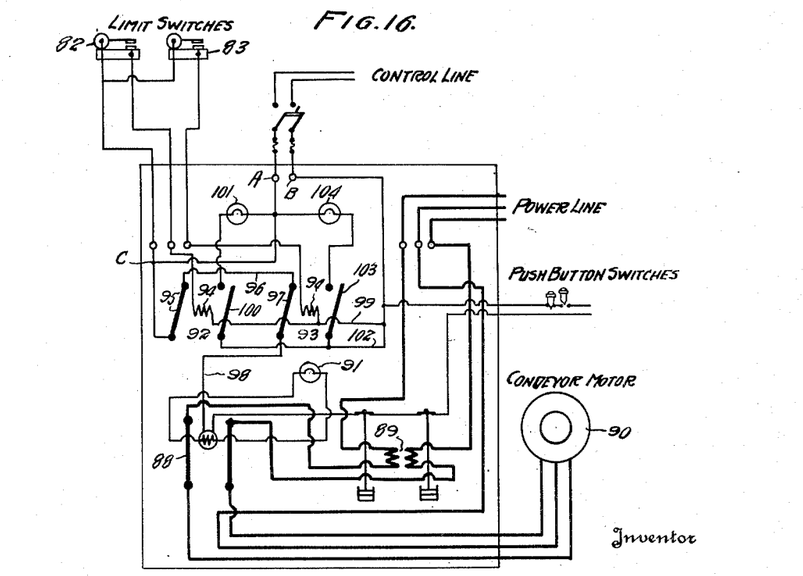
Figure 16 is a diagrammatic representation of the electric circuit employed for controlling the operation of the limit switches.

In Figure 16 I have shown diagrammatic representation of an electrical circuit for controlling the operation of the conveyor motor by means of the limit switches 82 and 83. Suitable conduits connect a circuit breaker 88 with a power line of suitable capacity. The connection is made through dash pot current control devices 89 so as to avoid a sudden overloading of the line upon actuation of the circuit breaker 88 to complete the circuit to the conveyor motor 90. When the circuit is complete from the power line through the circuit breaker 88 to the conveyor motor 90, an independent circuit is energized which contains signal light 91. The circuit containing the signal 91 may be associated with circuit breaker in any desired manner and in Figure 16 has been illustrated as being inductively coupled with the actuating coil of the circuit breaker.

The circuit for controlling the actuation of the circuit breaker 88 is shown in the upper left portion of Figure 16. This latter circuit includes the limit switches 82 and 83 and a pair of relays 92 and 93. Each of the relays comprises a pair of switch arms adapted to be actuated together by coils 94 which are energized upon completion of an electrical circuit through either of the limit switches.

Normally when the limit switches are in open position, arms of the relays are in the position shown in Figure 16, that is, starting with the point A the current passes to point C and down to the swivel point of contact arm 95, upwardly through arm 95, line 96, through contact arm 97, through conduit 98 to the energizing coil of the circuit breaker 88 thence through the dash pot control device 89 to the push button switches and returns to point B. Upon actuation of limit switch 82 the current will flow from the point A to point C through the limit switch 82 to coil 94 of relay 92 through conduit 99 and return to point B. Upon energizing the coil 94 the arms 95 and 100 will be actuated so that the circuit through arms 95 will be broken and a circuit through arm 100 will be completed. This operation will break the circuit through the actuating coil of circuit breaker 88, thereby causing the circuit from the power line to the conveyor motor 90 to be broken. Of course, upon breaking the circuit from the conveyor line to the conveyor motor signal device 91 will cease operation. Upon completion of the circuit through arm 100 current will flow through the circuit from the point A through signal device 101 through arm 100, conduit 102 and back to point B. Signal device 101 will then be placed in operation which will indicate to the operator that the conveyor motor has stopped.

Assuming that the switch arms are in the position shown in the drawings and that circuit is completed through limit switch 83, in this instance current will flow from point A to point C through limit switch 83, through coil 94 of relay 93, through conduit 99 and back to point B. This will cause coil 94 of the relay 93 to be energized, moving switch arms 97 and 103. Upon movement of the switch arms the circuit through the arm 97 leading to the energizing coil of circuit breaker 88, will be broken thereby causing the conveyor motor to stop. On the other hand switch arm 103 will complete an electrical circuit from point A through signal device 104, through arm 103, conduit 102, back to point B indicating that the motor has stopped because of contact of a carriage with limit switch 83.

The control circuit just described has been given by way of illustration and the present invention is not to be limited thereby since other control circuits may be employed if desired.

The carriages 69 with the racks positioned thereon are slowly moved through the treating apparatus, and the material supported in the racks will be subjected to the conditioned gas passing transversely across the path of movement of the material undergoing treatment. As heretofore pointed out, each of the sections of the conditioning apparatus may be operated to produce different results on the material undergoing treatment. After the rack containing the material has moved in a path through the treating apparatus, the rack will engage a second stop switch 83 which serves to prevent any of the racks from repeating the treatment.

Of course, if it is necessary to subject the material to more than one treatment in the conditioning apparatus the rack can be removed from the unloading station and introduced into the conveyor at the loading station. In most instances, however, it will be found that a once through treatment of the material contained on the rack will be sufficient.

As is clearly shown in Figure 4, the loading and unloading station may be at the same point. This construction is very desirable, particularly in a factory where economy of floor space is necessary. For instance, in a shoe factory, it may be desirable to position the loading and unloading station at a point just between the levelers and heelers so that the shoes may be loaded onto the racks at the point where the leveling operation is carried out, and the racks introduced into the conditioned apparatus at a point adjacent the levelers. After being conveyed through the apparatus to treat the shoes, the racks may be removed therefrom at substantially the same point at which they were loaded onto the apparatus and moved only a short distance to the location where the heeling operation is taking place.

The present invention also contemplates positioning the loading and unloading stations at any point on the apparatus. For instance, they may be positioned adjacent either end or either side thereof or at the ends or at any point midway between the ends. It is also within the concept of the present invention to have the loading station at one point on the apparatus and the unloading station at an entirely different point.

Figure 18:
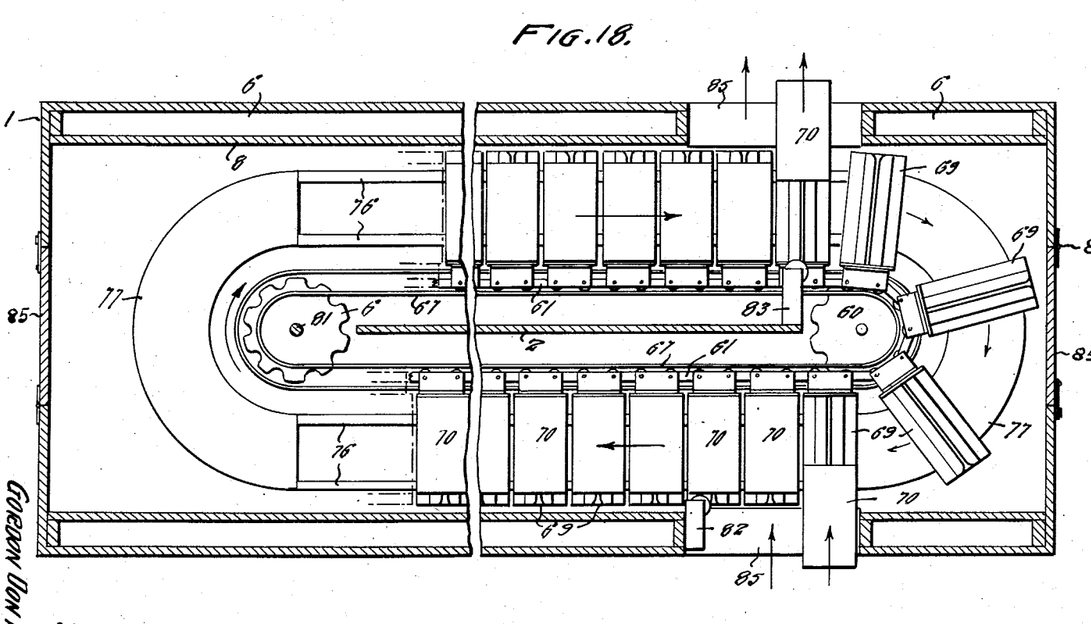
Figure 18 is a view somewhat similar to that shown in Figure 6 in which the loading and unloading stations are positioned on opposite sides of the treating apparatus.

For instance, in Figure 18, there is shown an apparatus in which the material to be treated is loaded onto the conveyor just after it has passed around one of the sprockets 60. In this form of the invention, the racks are adapted to be moved from the conveyor at substantially the same end of the apparatus but on the other side thereof. Of course, this feature of the invention is susceptible to many modifications and the loading station may be positioned at any point on the apparatus and the unloading station may be positioned at any point. Also, it may be desirable to provide a plurality of loading and unloading stations.

As shown in the drawings, particularly Figure 18, the size of the doorways constituting the loading and unloading stations are of a width to permit the loading or unloading of two material carrying racks at the same time. I wish it to be clearly understood that the showing of the drawings is more or less by way of illustration and that the invention is not to be limited thereby, but that the width of the loading and unloading openings may be varied, as desired, to permit the loading of any required number of carriages at the same time.

In the drawings, there have been shown doors arranged in the ends of the treating apparatus in addition to those serving as the loading and unloading stations. These doors 85 which are supported by hinges 86, serve the purpose of permitting an operator to enter into the treating chamber at the ends thereof so as to inspect and repair the apparatus if necessary. In addition to the doors at the ends, similar inspection doors or openings may be provided at other places in the apparatus.

The present invention is of particular advantage especially when employed for conditioning shoes and other materials requiring similar treatment in that the control of the conditions existing in the apparatus may be so regulated that the shoes or other articles may be permitted to remain in two or three times longer than is ordinarily required for the drying and conditioning operation, without the shoes being over dried. This feature is desirable from the manufacturing standpoint in that when there is some delay in production, or the operation beyond the heelers, shoes undergoing treatment, may be left in the machine without detrimentally affecting the condition thereof. Racks of shoes may be left in a machine over night without becoming over dry and will be in perfect condition for the heeling and subsequent operation the next morning.

To illustrate the flexibility of control of an apparatus constructed in accordance with this invention, a single rack of shoes may be sent through the machine alone and immediately thereafter the machine may be loaded to capacity and in each case the shoes being taken from the machine after treatment will be found to be in substantially the same uniform condition.

Another advantageous feature of an apparatus constructed in accordance with the present invention resides in the construction of the apparatus which prevents an operator from removing a rack of shoes or other material undergoing treatment from the machine after the rack has passed from the loading station.

For instance, after a rack containing material to be treated has passed from the loading station, it will be impossible for the operator to walk into the apparatus and withdraw the rack containing the material from the conveyor. This feature is of advantage in that it is impossible to remove a rack of material undergoing treatment from the apparatus until the material has been subjected to the prescribed period of treatment.

Another desirable feature of the present invention is that the same can be installed in a factory without cutting into the floor of the factory to position the conveying mechanism relative to the treating apparatus. All that is necessary is that the tracks or wearing strips which support the conveying apparatus be secured to the factory floor.

It will be appreciated from the foregoing description that the present invention provides an apparatus which is especially adapted for conditioning materials with conditioned air. The apparatus described is also advantageous in that it is practically impossible to remove a rack containing material to be treated after it has once been put into the apparatus, at a time before it has received the complete treatment to be given in passing through the apparatus. Another desirable feature is that it is not necessary to remove the material from the apparatus after it has been passed therethrough but the material may be permitted to remain in the apparatus until it is needed for a subsequent operation. This feature is also advantageous in that there is no reason for an accumulation of racks on the floor of the factory, taking up space which could be used to advantage for other purposes.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An apparatus for treating materials comprising an elongated chamber, a vertical partition within said chamber spaced from the ends thereof adapted to divide the chamber into two subchambers, a conditioning compartment positioned on the upper portion of each of said subchambers, means in said compartment for humidifying gas therein, a heating compartment arranged on each side of said chamber communicating therewith through ports in the walls of said chamber and communicating with said conditioning compartment, a second compartment constituting an exhaust compartment positioned on the roof of each of said subchambers adjacent the partition and communicating with the subchambers through apertures in the roof thereof, and means for circulating a conditioning gas through said conditioning compartment into the heating compartment into the subchamber, and thence from the subchamber into the exhaust compartment, and means for moving material to be treated in a substantially annular path about said partition.

2. An apparatus for treating materials comprising an elongated chamber, a vertical partition within said chamber spaced from the ends thereof adapted to divide the chamber into two subchambers, a conditioning compartment positioned on the upper portion of each of said subchambers, means in said compartment for humidifying gas therein, a heating compartment arranged on each side of said chamber communicating therewith through ports in the walls of said chamber and with said conditioning compartment, a second compartment constituting an exhaust compartment positioned on the roof of each of said subchambers adjacent the partition and communicating with the subchambers through apertures in the roof thereof, and means for circulating a conditioning gas through said conditioning compartment into the heating compartment into the subchamber, and thence from the subchamber into the exhaust compartment, means for moving material to be treated in a substantially annular path about said partition, and means for withdrawing a portion of the gas from said exhaust compartment to reduce the humidity of the gas circulating through said compartments and subchamber.

3. An apparatus for treating materials comprising an elongated chamber, a vertical partition within said chamber spaced from the ends thereof adapted to divide the chamber into two subchambers, a conditioning compartment positioned on the upper portion of each of said subchambers, means in said compartment for humidifying gas therein, a heating compartment arranged on each side of said chamber communicating therewith through ports in the walls of said chamber and with said conditioning compartment, a second compartment constituting an exhaust compartment positioned on the roof of each of said subchambers adjacent the partition and communicating with the subchambers through apertures in the roof thereof, and means for circulating a conditioning gas through said conditioning compartment into the heating compartment into the subchamber, and thence from the subchamber into the exhaust compartment, means for moving material to be treated in a substantially annular path about said partition, and means responsive to variations in the humidity of the gas circulating through the compartments and subchamber for regulating the amount of water vapor supplied to the gas.

4. An apparatus for treating materials comprising a chamber, a partition within said chamber spaced from the ends thereof and dividing the same into two parallel subchambers, communicating with each other at the ends thereof, a conveyor positioned within said chamber adapted to move in a substantially annular path about said partition, a humidifying compartment associated with the upper portion of each of said subchambers, a heating compartment positioned on one side of each of the subchambers and a gas discharge compartment on the other side thereof, and means for circulating a gas through the compartments and subchambers.

5. An apparatus for treating materials comprising a chamber, a partition within said chamber spaced from the ends thereof and dividing the same into two parallel subchambers communicating with each other at the ends thereof, a conveyor positioned within said chamber adapted to move in a substantially annular path about said partition, a humidifying compartment associated with the upper portion of each of said subchambers, a heating compartment positioned on one side of each of the subchambers and a gas discharge compartment on the other side thereof, and means for circulating a gas through the compartments and subchambers, said heating and discharge compartments communicating with the subchamber through walls having adjustable ports therein to regulate the flow of gas through the subchamber.

6. An apparatus for treating materials comprising a chamber, a partition within said chamber spaced from the ends thereof and dividing the same into two parallel subchambers, communicating with each other at the ends thereof, a conveyor positioned within said chamber adapted to move in a substantially annular path about said partition, a humidifying compartment associated with the upper portion of each of said subchambers, a heating compartment positioned on one side of each of the subchambers and a gas discharge compartment on the other side thereof, means for circulating a gas through the compartments and subchambers, and means operable upon variations in the humidity of the gas for regulating the quantity discharged and recirculated.

GORDON DON HARRIS.